United States Patent
Davis (12)

(10) Patent No.: US 6,256,663 B1
(45) Date of Patent: Jul. 3, 2001

(54) SYSTEM AND METHOD FOR CONDUCTING FOCUS GROUPS USING REMOTELY LOADED PARTICIPANTS OVER A COMPUTER NETWORK

(75) Inventor: Hugh O. Davis, Westport, CT (US)

(73) Assignee: Greenfield Online, Inc., Westport, CT (US)

( * ) Notice: Subject to any disclaimer, the term of this patent is extended or adjusted under 35 U.S.C. 154(b) by 0 days.

(21) Appl. No.: 09/236,143

(22) Filed: Jan. 22, 1999

(51) Int. Cl.[7] .................................................. G06F 13/00
(52) U.S. Cl. ........................ 709/204; 345/330; 370/260
(58) Field of Search ............................ 709/204; 345/330, 345/229; 370/260

(56) References Cited

U.S. PATENT DOCUMENTS

| 5,404,509 | 4/1995 | Klein ..................................... 707/101 |
| 5,544,299 | 8/1996 | Wenstrand et al. .................. 345/339 |
| 5,880,731 | * 3/1999 | Liles et al. ............................ 345/349 |
| 5,978,835 | * 11/1999 | Ludwig et al. ....................... 709/204 |
| 6,061,440 | * 5/2000 | Delaney et al. ...................... 379/202 |

OTHER PUBLICATIONS

User Interface Design for Videoconferencing Entries; IBM TDB; vol. 37, Issue 4A, pp. 539–540, Apr. 1994.*
Conferencing Metaphor; IBM TDB; vol. 36, Issue 2, pp. 63–66, Feb. 1993.*

* cited by examiner

Primary Examiner—Kenneth R. Coulter
(74) Attorney, Agent, or Firm—Bourque & Associates, P.A.

(57) ABSTRACT

A system and method for conducting focus group discussions among remotely located participants is provided. The system includes a respondent computer interface for each respondent computer which controls display of a plurality of respondent chat messages provided by at least one moderator and the respondents and which blocks display of client and moderator chat messages generated by the clients and the moderator respectively, and at least one input device, which allows the respondent to input respondent chat messages. The system also includes a client computer interface for each client computer, which controls display of all of the respondent chat messages and a plurality of client chat messages which are provided by the moderator and the client(s). Each client computer also includes at least one input device to allow each client to input client chat messages. Also included in the system is a moderator computer for each moderator. Each moderator computer includes a moderator interface, which displays both the client chat messages and the respondent chat messages, preferably in client chat and moderator chat windows, respectively. Each moderator computer further includes an input device to allow moderators to input both client chat messages and respondent chat messages. The respondent computers, client computers and moderator computers are all interfaced to each other via a computer network.

16 Claims, 8 Drawing Sheets

| MESSAGE ID | PROJECT # | USER NAME | PRIVILEGES | MESSAGE |
|---|---|---|---|---|
| 1 | 123 | BILL | 1 | "HI..." |
| 2 | 123 | MARY | 2 | "I THINK..." |
| 3 | 123 | MEGAN | 3 | "WHAT ABOUT..." |
| . | | | | |
| . | | | | |
| . | | | | |

FIG. 8

SYSTEM AND METHOD FOR CONDUCTING FOCUS GROUPS USING REMOTELY LOADED PARTICIPANTS OVER A COMPUTER NETWORK

FIELD OF THE INVENTION

The present invention is related to conducting focus groups and more particularly, conducting focus groups using remotely located participants who are communicating over a computer network.

BACKGROUND OF THE INVENTION

In the world of marketing, focus groups are essential tools for acquiring feedback regarding new products. In particular, focus groups allow companies wishing to develop, package, name or test market a new product to discuss, view and/or test the new product before it is made available to the public at large and provide invaluable information regarding the product.

In traditional focus groups, a pre-screened (pre-qualified) group of respondents gathers in the same room. A moderator guides the group through a discussion that probes attitudes about a client's proposed products or services. Client representatives observe the discussion from behind a one-way mirror. Usually, a video camera records the meeting so that it can be seen by others who were not able to travel to the focus group site. Transcripts are also created from the video tape.

While such traditional focus groups provide accurate information, they are costly to implement. For example, if a product is to be marketed on a nation-wide basis, it would be critical to gather respondents from various locales throughout the country since attitudes about a new product may vary due to geographical considerations. As can be appreciated, this would require a significant expenditure in terms of travel and lodging expenses. Additionally, the site of a traditional focus group may or may not be in a locale convenient to a specific client. Accordingly, client representatives may have to incur travel and lodging expenses as well.

With the advent of large scale computer networks, such as the Internet, it is now much easier to link respondents electronically and thus avoid a significant amount of travel expenses. NFO Research, a market research giant, has recently announced a new form of focus group namely, an "on-line" focus group. The NFO system of on-line focus groups allows respondents from all over the country to gather, electronically, while avoiding countless logistical headaches.

Potential focus group respondents are invited by e-mail. Those who accept the invitation receive a URL and a password that admits them to a protected area within a website maintained by NFO Research. When they arrive, a trained moderator will conduct the on-line focus group over the Internet.

In NFO's on-line focus groups, when a question is asked of the group, all of the respondents type their responses simultaneously. On-line focus groups may begin with a simple series of text-based questions or they may jump right in to a technical discussion. Using a variety of commercially-available software programs, sophisticated images can be displayed on the respondent's computer screens. These images can take the form of web pages, a photo slide show, storyboards of possible future advertising or even three-dimensional (3-D) graphics.

While the NFO system of on-line focus groups does eliminate some of the logistical headaches and travel expenses associated with conducting focus groups, the NFO system still requires one or more representation from a client to be physically located with the moderator conducting the focus group. In this way, questions can be added in real time to further probe a particular response. Thus, even the NFO system requires some travel expenses since a client representative will need to travel to a NFO Research site or vice versa.

Accordingly, there is a need for the system and method of conducting focus groups using remotely located participants, including one or more moderators, one or more clients and one or more respondents, who are all physically remote from each other. In order to do this, such a system must allow for the implementation of at least two separate chat discussions to be conducted simultaneously between the three classes of focus group participants to provide an electronic analog to a one-way mirror segregating clients from respondents. In addition, such a system must allow and prohibit participation in the different chat discussions based on the class of the participant.

SUMMARY OF THE INVENTION

The disclosed invention satisfies this need by providing a system for conducting focus group discussions among participants including at least one moderator, at least one client and at least one respondent, wherein the participants are remotely located from one another yet interconnected or linked so as to exchange data of one or more formats. This system comprises a respondent computer interface for each respondent computer. The respondent interface includes a plurality of respondent chat messages provided by at least one moderator and all connected respondents. The respondent computer interface also prevents or blocks respondents from viewing and generating client chat messages and moderator chat messages. Each respondent computer also includes at least one input device, which allows the respondent to input respondent chat messages.

The system further includes a client computer interface for each client computer. The client interface displays the respondent chat messages and client chat messages. The client chat messages are provided by the moderator and connected client(s). The client computer interface also blocks the client from generating respondent chat messages. Like the respondent computer, each client computer also includes an input device to allow each client to input client chat messages.

Also included in the system is a moderator computer interface for each moderator computer. The moderator interface displays both client chat messages and respondent chat messages, preferably in client chat and moderator chat display areas or "windows", respectively. Additionally, the moderator computer interface allows the moderator to both view and generate respondent and client chat messages.

Each moderator computer further includes an input device to allow moderators to input both client chat messages and respondent chat messages.

The respondent computers, client computers and moderator computers are all interfaced to each other via a computer network such as the World Wide Web.

DESCRIPTION OF THE DRAWINGS

These and other features and advantages of the present invention will be better understood by reading the following detailed description, taken together with the drawings wherein:

FIG. 8 shows a chat message database table which includes database fields useful in implementing the simultaneous chat discussions.

DETAILED DESCRIPTION OF THE PREFERRED EMBODIMENT

Figure 1:
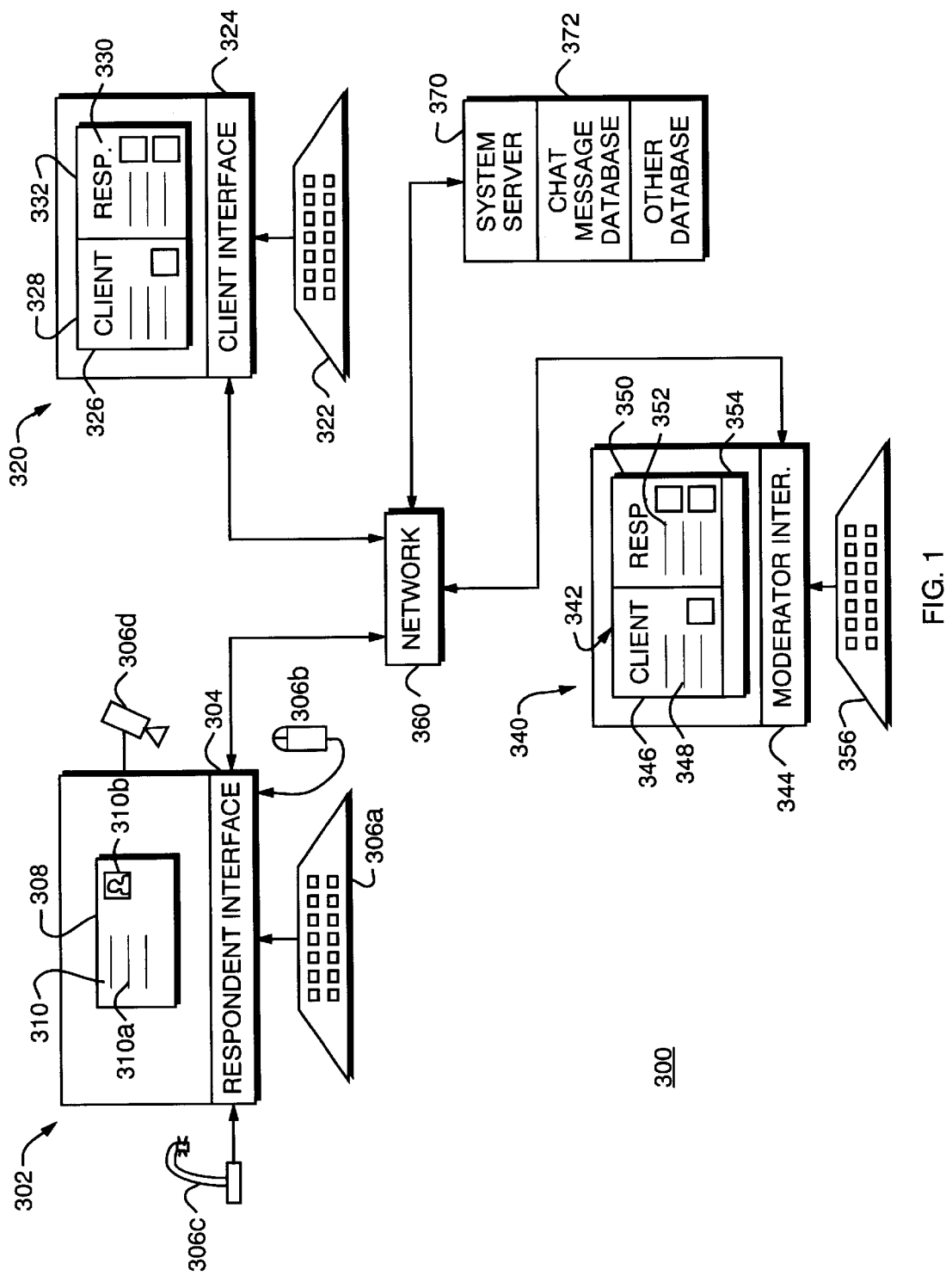
FIG. 1 is a block diagram of the system of the present invention.

The present invention features a system 300, FIG. 1, for conducting focus group discussions among participants with the various participants including at least one moderator, at least one client and at least one respondent. A respondent typically has access to a respondent computer 302 including a respondent computer interface 304, a respondent computer input device such as a keyboard 306A, a mouse 306B, a microphone 306C or a camera 306D. A respondent computer also includes a display device 308 such as a computer monitor capable of displaying one or more "windows" or display areas of information.

In the case of the respondent computer, the respondent computer interface 304 allows the respondent (not shown) to view a plurality of displayed respondent chat messages 310 which may include text 310A or graphic images 310B. As will be explained in greater detail below, the respondent computer interface 304 prevents or blocks the respondent from viewing and/or generating client chat messages and moderator chat messages.

In a similar fashion, a client having access to a client computer 320 utilizes one or more input devices 322 such as a keyboard (mouse, microphone, camera, digitizing tablet, or the like) to enter client chat messages through the client interface 324. The client interface 324 controls display of client chat messages 326 to the client chat message display "window" or area 328 as well as controlling respondent chat messages 330 displayed to respondent chat "window" display "window" or area 332. As previously disclosed, either or both of the client or respondent chat messages may include text or graphical representations, including photographs and images.

Unlike the respondent interface, the client interface 324 allows for the display of both client and respondent chat message display areas. The client interface also allows the client (not shown) having access to the client computer 320 to input client chat messages 326 through an input device such as keyboard 322 while blocking the input of respondent chat messages 330. Accordingly, one or more clients having access to one or more client computers 320 can communicate among themselves and to a moderator but not to respondents.

Much like the client computer, the moderator computer 340 includes a display device 342 such as a computer monitor which, controlled by a moderator computer interface 344, can display at least the first window or display area 346 containing client chat messages 348 (such as text or graphical information); a respondent chat message area or "window" 350 containing respondent chat message text or graphical information 352 as well as a moderator control area 354.

Like a client, a moderator may view both client chat messages and respondent chat messages. Unlike a client, however, a moderator may send both client chat messages and respondent chat messages using one or more methods including a proper selection of the control panel 354 to select other text entered by an input device 356 such as a keyboard, or be sent as a chat message, hyperlink or image destined for the client chat message "window" and/or the respondent chat message window. The moderator interface 344 then controls transmission of the chat messages to other participants of the focus group.

A feature of the present invention is the fact that all participants are located remotely from one another and are interconnected or linked by means of a network 360 that is a local area network (LAN), wide area network (WAN) the internet (World Wide Web) or other computer or interconnection network.

The present invention also preferably includes a system server 370, interconnected to the computer network 360 and other participants, including one or more databases such as a chat message database 372 as will be explained in greater detail below.

Figure 2:
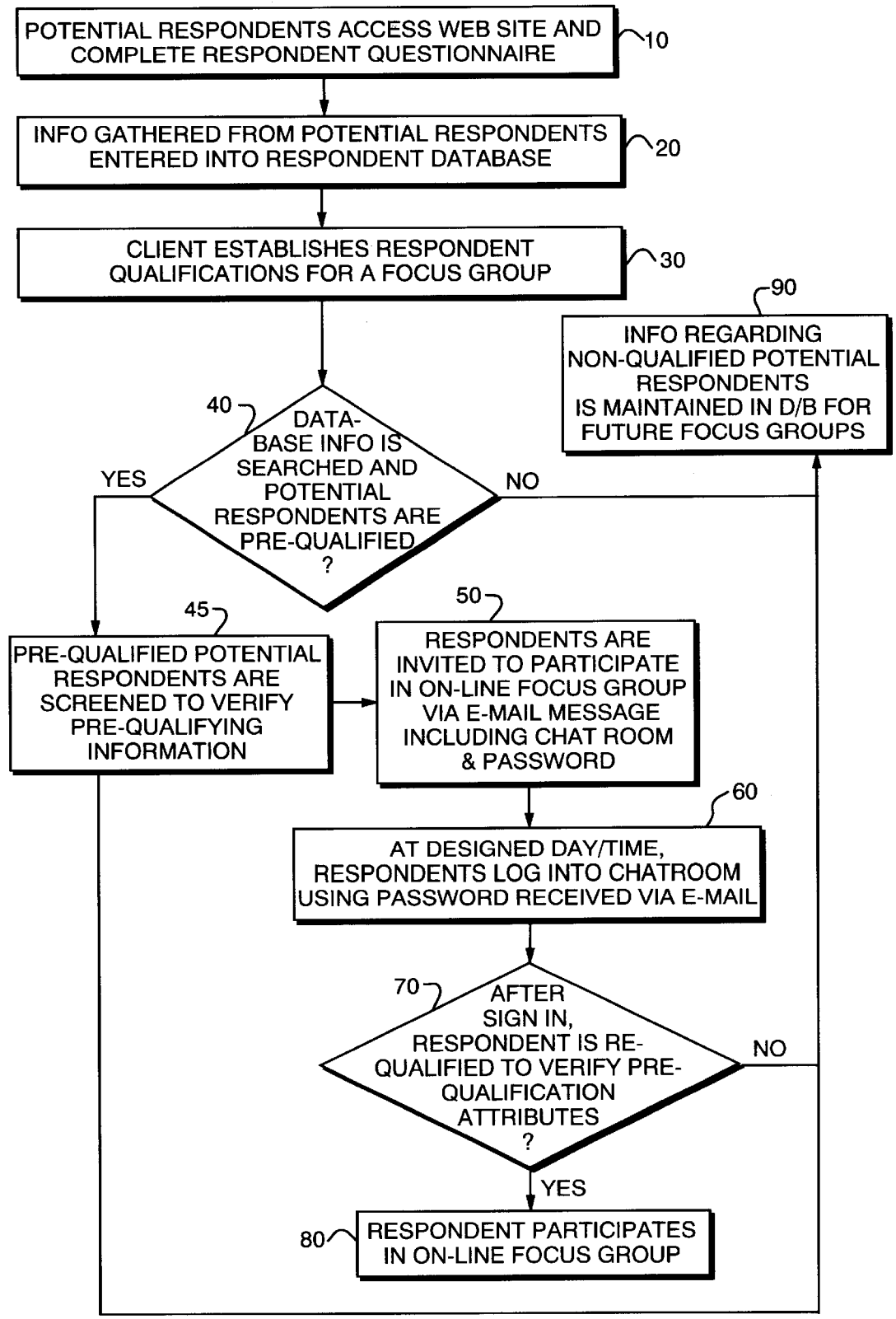
FIG. 2 is a flow diagram showing a method of selecting respondents to participant in an on-line focus group.

In order to conduct a focus group in an on-line environment, a plurality of respondents must be gathered. FIG. 2 shows a method of obtaining and selecting potential respondents to participate in an on-line focus group according to the principles of the present invention. First, potential respondents access a website provided by the focus group provider and complete a respondent questionnaire, step 10. The information gathered from the potential respondents is then included in a respondent database, step 20, which is maintained by the focus group provider.

When a client wishes to conduct an on-line focus group, the client establishes respondent qualifications, which are directed at obtaining a suitable sample of potential respondents, step 30. The focus group provider then searches the information maintained in the respondent database and pre-qualifies those respondents who meet the client established respondent qualifications, step 40.

When a suitable number of pre-qualified potential respondents are identified, the pre-qualified potential respondents are invited to respond to a screening survey, step 45. This is accomplished by e-mailing the pre-qualified potential respondents a screening survey, which further qualifies the pre-qualified potential respondents based on exact screening specifications established by a client. The screening survey also validates the information provided by the pre-qualified potential respondents provided in step 10, above.

Successfully screened, pre-qualified potential respondents are invited to participate in an on-line focus group via an e-mail message, step 50. Those who do not pass the screening step are returned to the database for possible selection for participation in future focus group sessions.

The e-mail message sent to each successfully screened, potential respondent includes the date and time for the particular focus group, as well as a chat room ID and a password, which will allow the potential respondents to access the designated focus group chat room and participate in the focus group. Then, at the designated date and time, respondents log into the designated chat room using the password they received via the e-mail message, step 60. After sign in, each respondent may, if desired, be re-qualified to verify the respondent's pre-qualification attributes, step 70. As long as the re-qualification is acceptable, then the respondent may participate in the designated on-line focus group, step 80.

If, on the other hand, a potential respondent is not qualified to participate, the respondent will be denied entry or ejected from the focus group chat room. However, the information regarding all non-qualified potential respondents is maintained in the database for future focus groups, step 90.

Figure 3:
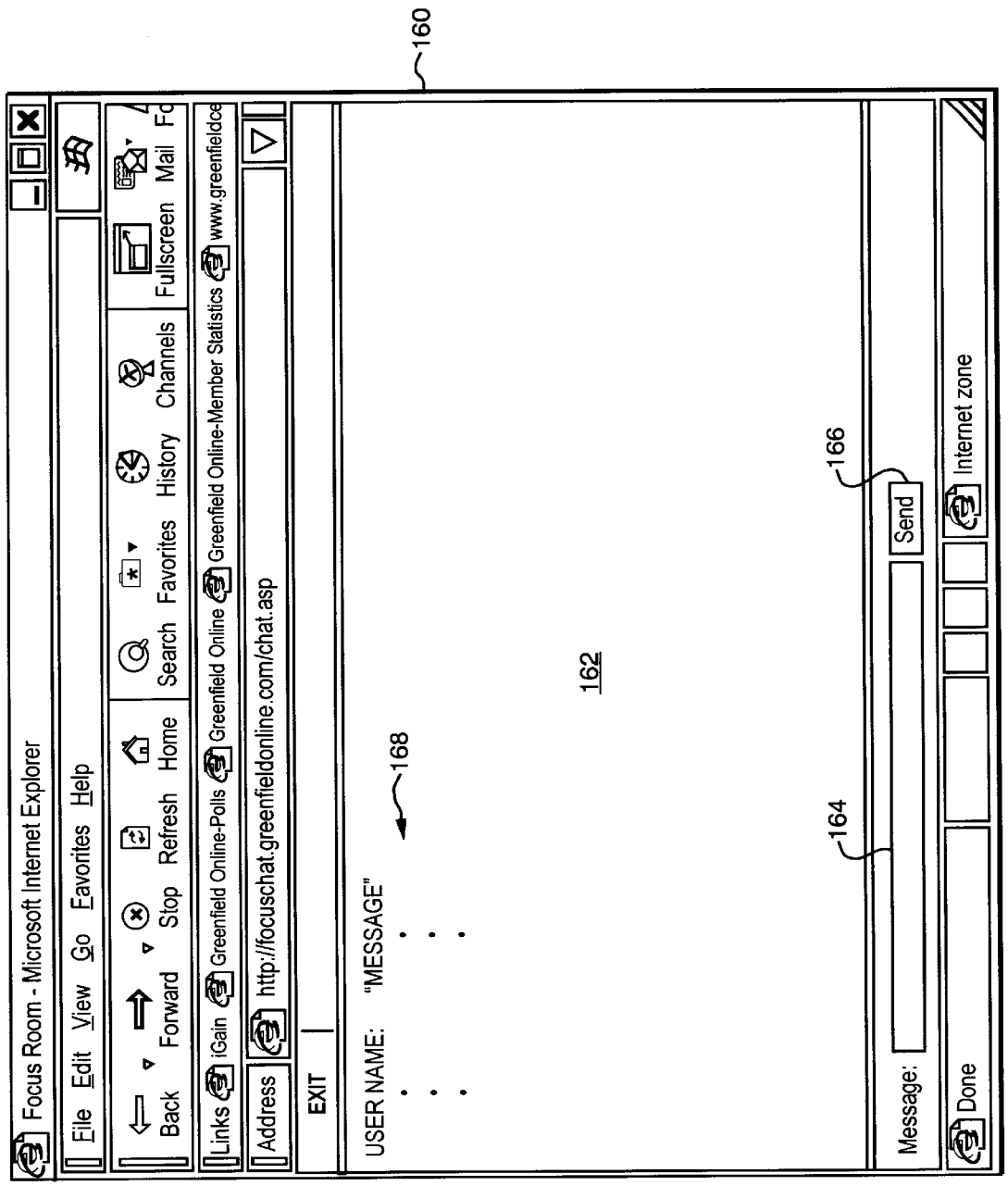
FIG. 3 is a screen display showing a respondent interface through which respondent chat messages are input, displayed and read.

Turning now to FIG. 3, a respondent interface 160 is shown. As indicated above, respondents who are invited to participate in an on-line focus group enter a designated chat room provided by the focus group provider. In the preferred embodiment, the chat rooms are implemented using the Internet (World-Wide-Web), and are accessed using any one of a number of commercially-available web browsers, such as Microsoft Internet Explorer and Netscape Navigator. The respondent interface 160 appears as a standard web chat room and requires no special hardware or software other than a computer and World-Wide-Web browser suitable for accessing the focus group provider website.

When a respondent successfully logs into the designated chat room, a respondent display 162 is provided, wherein a plurality of respondent chat messages 168 are displayed in a series fashion known as a "chat discussion" or "chat thread". In order to post respondent chat messages, a respondent uses at least one respondent input device, such as a keyboard, mouse or microphone to type respondent chat messages. When chat messages are typed, they appear in the active respondent message window 164. Upon selection of the "send" button 166, the message input into the active respondent message window is transmitted to the on-line focus group provider and is subsequently displayed as a next message in the list of messages 168. The manner by which this is accomplished will be discussed in more detail below. Each respondent chat message includes the name of the respondent posting the message and the chat message itself.

In addition, as will be discussed in more detail below, a moderator, who leads the respondent chat discussion may post graphics for display in the message window 162 to solicit respondent responses. Of course, the principles of the present invention are equally applicable to audio and video files as well.

Figure 4:
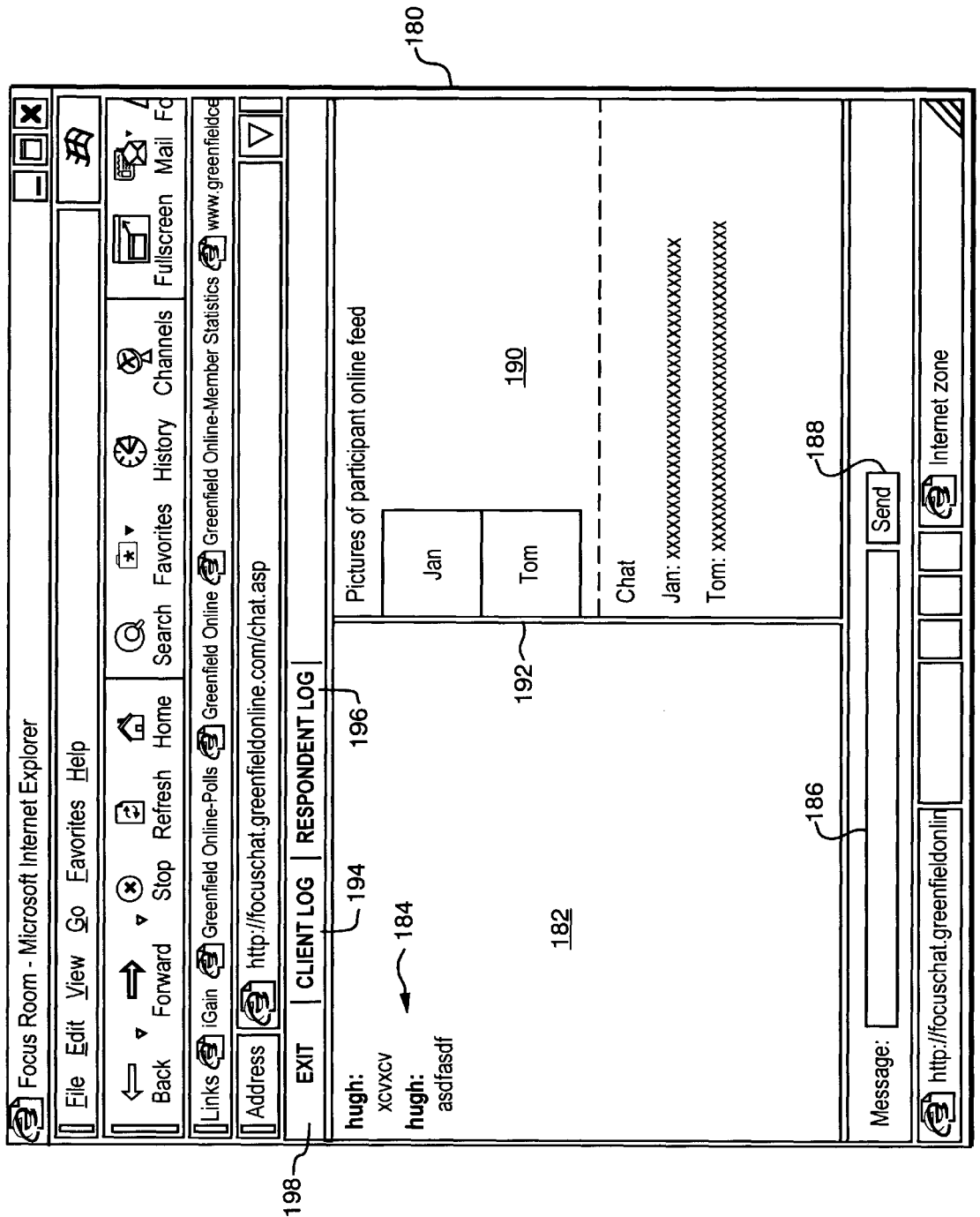
FIG. 4 illustrates a client display through which client chat messages are input, displayed and read and where the respondent chat discussion is monitored.

Turning now to FIG. 4, a client interface 180 is shown. The client interface 180 is divided into two display areas or "windows". The first window is a client chat message window 182. The second window is a respondent message window 190.

The respondent message window 190 allows a client viewing the client interface 180 to view all of the respondent chat messages exchanged between the focus group moderator and the plurality of respondents. In other words, the respondent chat message window 190 provided in the client interface 180 mirrors or mimics the respondent chat message window 162 of FIG. 3.

In the client chat message window 182, a list of client chat messages 184 is displayed. Client chat messages are displayed in a sequential fashion similar to the display of respondent chat messages in the respondent chat message window 190. Client chat messages are generated by clients and moderators but not by respondents, who may only generate respondent chat messages, as indicated above.

In order to enter a client chat message, the client inputs a client chat message using an input device, such as a keyboard, mouse or microphone. The client chat message then appears in the active client chat message window 186. Upon selection of the client chat message "send" button 188, the client chat message displayed in the active client chat message window 186 will be transmitted to the focus group provider and will be subsequently displayed in the client chat message discussion list 184 to all clients and moderators, but not respondents.

The client chat message window 182 and respondent chat message window 190 are divided by the divider 192, which provides the electronic analog of the one-way mirror utilized in traditional focus groups. While a client may monitor the respondent chat message discussion, he or she may only participate in the client chat discussion. Clients are not permitted to participate in the respondent chat discussion and respondents are unaware of the client chat messages. Therefore, any client chat messages input will only be posted in the client chat message window 182.

However, as with traditional focus groups, by monitoring the chat messages provided by the respondents participating in an on-line focus group, a client may alter or modify the direction of the focus group or suggest additional questions and/or information to be provided to the respondent. This is accomplished by inputting a client chat message, which is directed to the focus group moderator.

Also provided on the client interface 180 are client log and respondent log selection icons 194 and 196, respectively, which allow a client to print out or download a log of all of the messages posted in the client chat message window as well as all of the messages posted in the respondent chat message window. At the end of the on-line focus group, the client would exit by selecting the exit icon 198.

Figure 5:
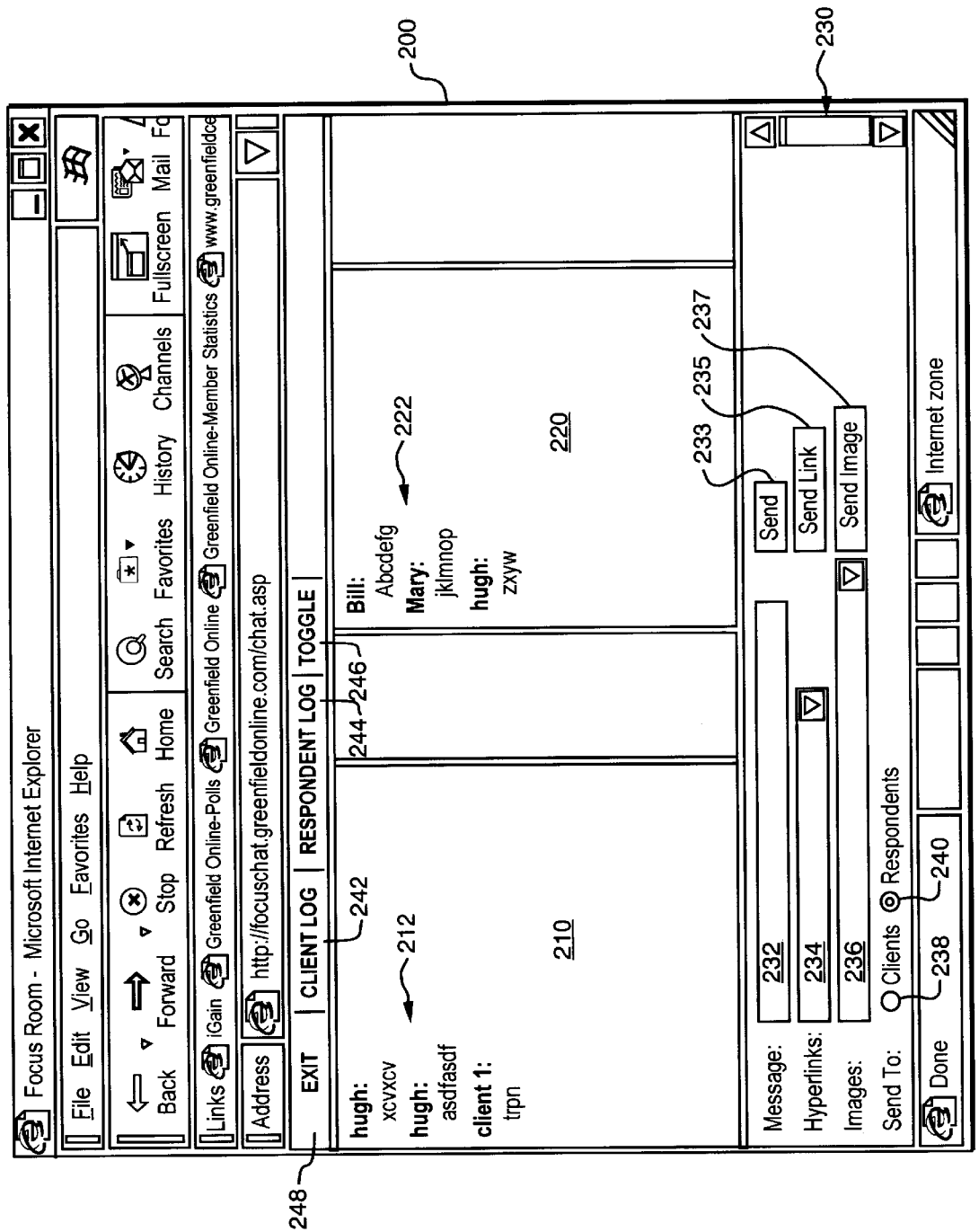
FIG. 5 illustrates one embodiment of a moderator display through which client chat messages and respondent chat messages are input, displayed and read.

FIG. 5 shows a first embodiment of a moderator interface 200. As indicated above, an on-line focus group moderator guides a group of respondents through a focus group. At the same time, the moderator interacts with one or more clients. Thus, in a manner similar to the client interface, the moderator interface 200 includes a client chat message window 210 and a respondent chat message window 220. Thus, the moderator can monitor both the client chat message discussion 212 and the respondent chat message discussion 222.

However, unlike the respondents, who may only participate in the respondent chat discussion, and the clients, who may only participate in the client chat discussion, a moderator may participate in both discussions. Accordingly, the moderator interface 200 provides a means by which a moderator may post messages to either the client chat message window 210 or the respondent chat message window 220.

In the embodiment of FIG. 5, this is accomplished using a single moderator message window 230. The moderator message window 230 allows the moderator to input messages using an input device, such as a keyboard, in an active message window 232. In addition, a moderator may select a hyperlink to send to either the client chat discussion or the respondent chat discussion using hyperlink window 234. Furthermore, images may be sent to either the client discussion window or the respondent discussion window using image selection window 236.

Each of the message, hyperlink and image selection windows includes a send icon 233, 235 and 237, respectively, which are selected to send the message, hyperlink or image to the desired chat message window. The client chat message window 210 will be selected by selecting the client chat message window radio button 238, which is also provided in the moderator message window 230. On the other hand, if a message, hyperlink or image is desired to be transmitted to the respondent chat message window 220, then the respondent radio button 240 is selected.

Like the client interface 180 (FIG. 4), the moderator interface 200 includes client and respondent log selection icons 242 and 244. Also provided is a toggle icon 246. Selecting the toggle icon alternatively selects between the two available moderator displays, i.e. the displays shown in FIGS. 5 and 6. Upon the completion of a focus group, a moderator exits the focus group by selecting the exit icon 248.

Figure 6:
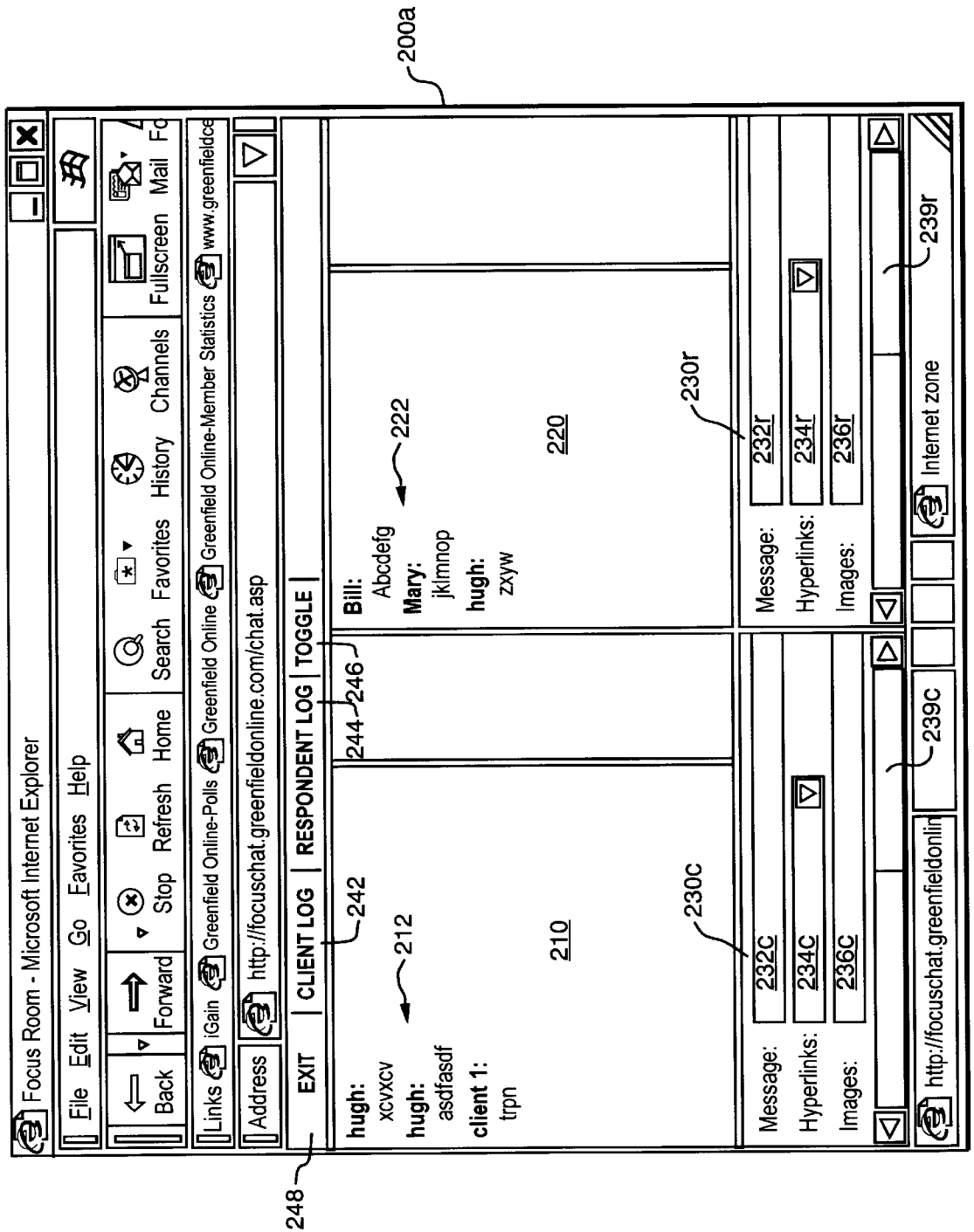
FIG. 6 is an alternative embodiment of a moderator display.

FIG. 6 shows a second embodiment of a client interface 200a. Like the first embodiment mentioned above, this embodiment of the moderator interface 200a includes a client chat message window 210 and a respondent chat message window 220. The remaining features indicated in FIG. 5, which use common reference numbers to those features identified and described above with respect to FIG. 5, operate in a like manner and will not be described again here. However, this embodiment of the moderator interface 200a differs in that it provides two moderator message windows.

The first moderator message window 230c is a moderator message window wherein client chat messages may be entered. In a manner similar to that described above, messages, hyperlinks and images may be input using message hyperlink and image windows 232c, 234c and 236c, respectively. Although not shown in FIG. 6, "send" buttons for each of the above are provided and may be unobscured using scroll bar 239c.

The second moderator message window 230r mirrors the message, hyperlink and image windows and "send" buttons provided with respect to the first moderator message window 230c. However, the second moderator message window 230r is dedicated to the input of respondent chat messages. Respondent chat messages may include text messages input into respondent message window 232r, hyperlinks selected in hyperlink message window 234r or images, selected in image selection window 236r. Again, a scroll bar 239r is provided to unobscure additional buttons, such as the "send" buttons associated with messages, hyperlink and images, respectively.

Figure 7:
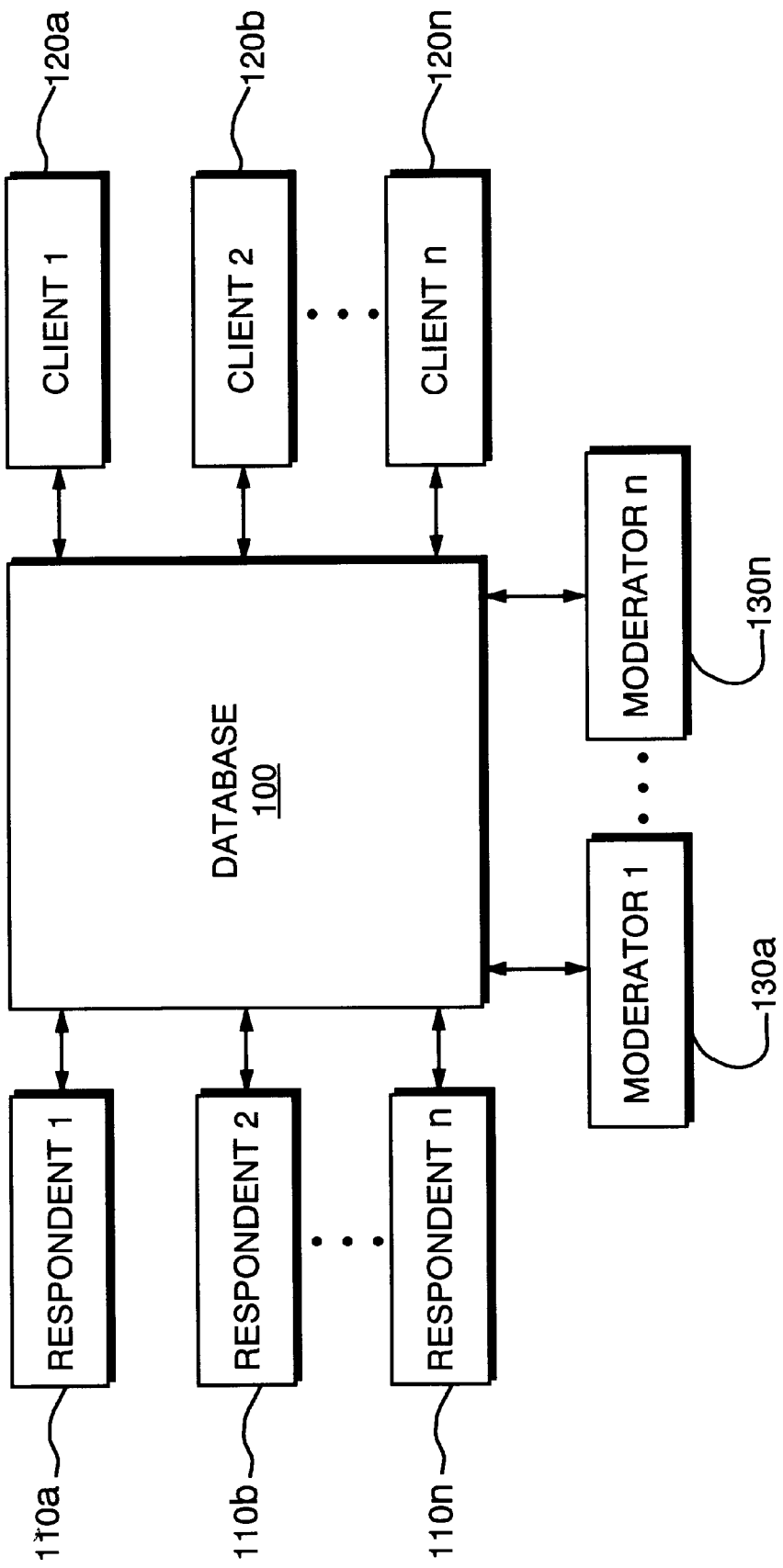
FIG. 7 is a block diagram of one embodiment of the present invention showing how simultaneous, multiple chat discussions are implemented using a chat message database.

In one preferred embodiment, the client chat message discussion and the respondent chat message discussion are implemented using a single database 100 (FIG. 7). In this manner, a plurality of respondents 110a through 110n may input respondent chat messages and transmit the same to database 100, where they will be stored. In a similar manner, a plurality of clients, 120a through 120n may input client chat messages, which are then transmitted to database 100. One or more moderator 130a through 130n may input either respondent chat messages or client chat messages, which are also transmitted and stored in database 100.

Turning now to FIG. 8, a database table 140 is shown. The database table 140 includes a number of fields including a message ID field 142, a project number field 144, a user name field 146, a privileges field 148, and a message field 150. The message IDs are numbered sequentially as messages are transmitted to the database 100 from respondents, moderators, and clients. Since each respondent, client and moderator is assigned to participate in a specific focus group, the messages must also be assigned to a particular discussion. This is accomplished by assigning a project number to each participant, which is maintained in the project number field 144.

In the example shown, message IDs 1, 2, and 3 are all related to the same project number, 123. However, as can be appreciated, a single database may maintain messages related to a plurality of different focus groups by using different project numbers associated with different message IDs.

Each message also includes the user name, which is maintained in user name field 146. Thus, whenever a message is posted to either the client or respondent chat message window, the name of the originator of the message is posted so that the various participants know who has provided the input.

The privileges field 148 is used to dictate which chat message windows a specific participant may access. For example, clients may only post messages to the client chat message window. In a similar manner, respondents may only post messages to the respondent chat message window. However, a moderator may post messages to both the client chat message window and the respondent chat message window. Therefore, each chat message originating from a moderator must include an entry in the privileges field to indicate where the particular message is to be directed. This is accomplished using the features provided in the moderator interface, which are used to send messages.

Finally, the actual message input, which may be a text message, a hyperlink or an image file is stored in the message field 150. Using a database structure, multiple, simultaneous chat discussions may be provided, which are critical to the implementation of the on-line focus group when all of the participants including respondents, clients and moderators may be located remotely from each other.

Accordingly, the present invention provides a system and method for conducting focus groups where the participants, including at least one client, at least one moderator and at least one respondent, may participate in a focus group even if all of the respondents are remotely located from each other. Thus, the logistical headaches and expenses realized using traditional focus groups are eliminated.

Modifications and substitutions by one of ordinary skill in the art are considered to be within the scope of the present invention, which is not to be limited except by the claims which follow.

What is claimed is:

1. A system for conducting focus group discussions among participants including at least one moderator, at least one client and at least one respondent, wherein said participants are remotely located one from another and are interconnected with each other over a computer network allowing at least electronic data exchange among said participants, said system comprising:

a respondent computer interface for a respondent computer, said respondent computer interface for displaying, on a respondent display associated with each respondent computer, a plurality of respondent chat messages generated by said at least one moderator and said at least one respondent, said respondent computer interface for not displaying client chat messages and moderator chat messages and for also allowing each said respondent to input respondent chat messages through said respondent computer interface using at least one respondent computer input device associated with each said respondent computer;

a client computer interface for a client computer, said client interface for displaying, on a client display associated with each client computer, said plurality of respondent chat messages generated by said at least one moderator and said at least one respondent, a plurality of client chat messages generated by said at least one client and said at least one moderator, said client computer interface for also allowing said at least one client to input client chat messages through said client computer interface using at least one client input device associated with each said client computer and for preventing said at least one client from entering respondent chat messages; and a moderator computer interface for a moderator computer, said moderator computer interface for displaying, on a client display associated with each moderator computer, said plurality of respondent chat messages and said plurality of client chat messages, said moderator computer interface for also allowing said at least one moderator to input respondent chat messages to be displayed to said at least one respondent and said at least one client, and client chat messages to be displayed to said at least one client through said moderator computer interface using at least one moderator input device associated with each said moderator computer.

2. The system for conducting focus group discussions as claimed in claim 1, wherein said computer network comprises the Internet World-Wide-Web.

3. The system for conducting focus group discussions as claimed in claim 1, wherein at least one of said respondent or client chat messages include audio files.

4. The system for conducting focus group discussions as claimed in claim 1, wherein at least one of said respondent or client chat messages include graphical images.

5. The system for conducting focus group discussions as claimed in claim 1, wherein at least one of said respondent or client chat messages include video data provided by at least one of said client, respondent and moderator.

6. The system for conducting focus group discussions as claimed in claim 1, wherein said client computer interface provides at least two display areas arranged on said client computer display, a first of said two display areas for displaying said client chat messages and a second of said two display areas for displaying said respondent chat messages.

7. The system for conducting focus group discussions as claimed in claim 1, wherein said moderator computer interface provides at least two display areas arranged on said moderator computer display, a first of said two display areas for displaying said client chat messages and a second of said two display areas for displaying said respondent chat messages.

8. The system for conducting focus groups as claimed in claim 7, wherein said moderator computer interface provides a chat message destination selector, for allowing said moderator to select between providing input as a client chat message and a respondent chat message.

9. The system for conducting focus group discussions as claimed in claim 1 further comprising a chat message database, for storing said respondent and client chat messages exchanged during a focus group discussion.

10. A method for conducting focus group discussions among participants including at least one moderator, at least one client and at least one respondent, wherein said participants are remotely located, one from another, each said at least one respondent having a respondent computer including a respondent computer interface, responsive to respondent chat messages, for displaying, on a respondent computer display device said respondent chat messages, each said at least one client having a client computer including a client computer interface, responsive to said respondent chat messages and client chat messages, for displaying, on a client computer display device said respondent chat messages in a respondent chat display area on said client computer display device, and for displaying said client chat messages in a client chat display area on said client computer display device, and each moderator having a moderator computer including a moderator interface, responsive to said respondent and client chat messages, for displaying, on a moderator computer display device said client chat messages in a client chat display area and for displaying said respondent chat messages in a respondent chat display area on said moderator computer display device, said at least one respondent computer, said at least one client computer and said at least one moderator computer interconnected with each other over a computer network, said method comprising the steps of:

- accepting and transmitting respondent chat messages provided by said at least one moderator from at least one moderator computer input device;
- accepting and transmitting respondent chat messages provided by said at least one respondent from at least one respondent computer input device in response to said respondent chat messages transmitted from said at least one moderator;
- displaying said respondent chat messages on said respondent computer display device and blocking display of client and moderator chat messages by said respondent computer interface;
- displaying said respondent chat messages in said respondent chat display area on said moderator and client computer display devices by said moderator and client computer interfaces respectively;
- accepting client chat messages provided by said at least one client from at least one client computer input device and provided by said at least one moderator from at least one moderator computer input device;
- displaying said client chat messages in said client chat display area on said on said moderator and client computer display devices by said moderator and client computer interfaces; and
- prohibiting, by said client computer interface, said respondent chat messages from being generated by said at least one client.

11. The method for conducting focus group discussions as claimed in claim 10, wherein said respondent, client and moderator computers are interconnected over a computer network comprising the Internet World-Wide-Web.

12. The method for conducting focus group discussions as claimed in claim 10, wherein said steps of accepting chat messages comprise accepting text messages from said at least one client, respondent and moderator.

13. The method for conducting focus group discussions as claimed in claim 10, wherein said steps of accepting chat messages provided by said at least one client, respondent and moderator comprises accepting graphical images from said at least one client, respondent and moderator.

14. The method for conducting focus group discussions as claimed in claim 10, wherein said steps of accepting chat messages provided by said at least one client, respondent and moderator comprises accepting audio files from said at least one client, respondent and moderator.

15. The method for conducting focus group discussions as claimed in claim 10, wherein said steps of accepting chat messages provided by said at least one client, respondent and moderator comprises accepting video data provided by said at least one client, respondent and moderator.

16. The method for conducting focus group discussions as claimed in claim 10 further comprising the step of storing said chat messages in a database.

* * * * *

(12) EX PARTE REEXAMINATION CERTIFICATE (7169th)
United States Patent
Davis

(10) Number: US 6,256,663 C1
(45) Certificate Issued: Nov. 17, 2009

(54) SYSTEM AND METHOD FOR CONDUCTING FOCUS GROUPS USING REMOTELY LOADED PARTICIPANTS OVER A COMPUTER NETWORK

(75) Inventor: Hugh O. Davis, Westport, CT (US)

(73) Assignee: Interactive Tracking Systems Inc., Saskatoon, Saskatchewan (CA)

Reexamination Request:
No. 90/010,385, Jan. 13, 2009

Reexamination Certificate for:
Patent No.: 6,256,663
Issued: Jul. 3, 2001
Appl. No.: 09/236,143
Filed: Jan. 22, 1999

(51) Int. Cl.
*G06Q 30/00* (2006.01)

(52) U.S. Cl. .................. 709/204; 370/260; 715/753
(58) Field of Classification Search .................. None
See application file for complete search history.

(56) References Cited

U.S. PATENT DOCUMENTS

| | | | |
|---|---|---|---|
| 5,107,443 A | 4/1992 | Smith et al. | |
| 5,495,412 A | 2/1996 | Thiessen | 364/401 |
| 5,581,702 A | 12/1996 | McArdle et al. | 395/200.04 |
| 5,689,418 A | 11/1997 | Monson | 364/420 |
| 5,758,110 A | 5/1998 | Boss et al. | 395/329 |
| 5,805,830 A | 9/1998 | Reese et al. | 395/200.35 |
| 5,949,414 A | 9/1999 | Namikata et al. | 345/332 |
| 6,069,943 A | 5/2000 | David et al. | 379/202 |
| 6,308,199 B1 | 10/2001 | Katsurabayashi | 709/204 |

OTHER PUBLICATIONS

Research Connections, Inc., Archived website, research connections.com, 1996, from http://web.archive.org/web/19980109131839/http//researchconnections.com/, downloaded Oct. 24. 2008.

Harris, Cheryl, Concept and Diagnostic Research for the web, Lessons from Case Studies 1995–1998, presented a ESMAR "Worldwide Intarnet Seminar" Parts Jan. 1998.
Silker, Christine M & Gurak, Lauran J., Technical Communication In Cyberspace: Report of a qualitative study, Technical Communication, Nov. 1996, vol. 43:4, p. 357.
Greenbaum, Thomas L., Internet Focus Groups: An Oxymoran, marketing News, Mar. 1997, vol. 31:5, p. 35.
Landreth, Darien, Focus Groups on the Net: some pros and cons of doing qualitative research online, Marketing, Magazine, May 1998, vol. 103:17, p. 16.
Fellman, Michelle Wirth, Qualitative Research Must Anticipate Technology Changes, Marketing News, Dec. 1998, vol. 32:25, p. 4.

(Continued)

*Primary Examiner*—Christopher E Lee

(57) ABSTRACT

A system and method for conducting focus group discussions among remotely located participants is provided. The system includes a respondent computer interface for each respondent computer which controls display of a plurality of respondent chat messages provided by at least one moderator and the respondents and which blocks display of client and moderator chat messages generated by the clients and the moderator respectively, and at least one input device, which allows the respondent to input respondent chat messages. The system also includes a client computer interface for each client computer, which controls display of all of the respondent chat messages and a plurality of client chat messages which are provided by the moderator and the client(s). Each client computer also includes at least one input device to allow each client to input client chat messages. Also included in the system is a moderator computer for each moderator. Each moderator computer includes a moderator interface, which displays both the client chat messages and the respondent chat messages, preferably in client chat and moderator chat windows, respectively. Each moderator computer further includes an input device to allow moderators to input both client chat messages and respondent chat messages. The respondent computers, client computers and moderator computers are all interfaced to each other via a computer network.

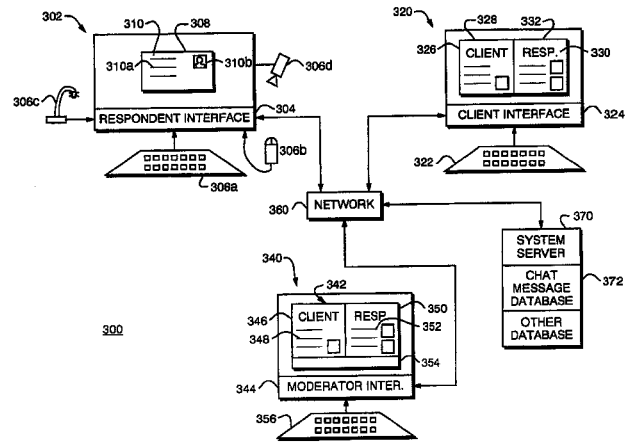

OTHER PUBLICATIONS

Murray, Peter J., Using Virtual Focus Groups in Qualitative Research, Qualitative Health Research, 1997, vol. 7:4, pp. 542–549.

Stewart, Kate & Williams, Matthew, Researching Online Populations: the use of online focus groups for social research, qualtitive Research, 2005, vol. 5:4, pp, 395–416.

Yoffie, Amy & Anzalone, Marj, In Defense of On–line Focus Groups, Quirk's Research Review, Jun. 1995.

Yoffie, Amy, Online Research: Playing to the Web's Strengths, Quirk's Marketing Resarch Review, Jul. 1998.

Virtual Surveys Limited, On–ine Research: Some Options, some problems, some cause studies, 1996.

Schafer, Sarah, Getting a Line on Customers, Inc. Magazine, Dec. 1996

Jacobson, Paul, On–Line Focus Groups: four approaches that work, Quirk's Research Reviews, Jun. 1997.

Harris, Cheryl, "Developing Online Market Research Methods and Tools—Considering Theorizing Interactivity: Models and Caases," Marketing and Research Today—The Journal of the European Society for Opinion and Marketing Research, 25:4 (Nov. 1997).

"Virtual Focus Group Facility Eliminates Physical Limits for Market Researches," PR Newswire, Research Connections, Inc., Apr. 17, 1997.

TalkCity (tutorial manual), Internet Archive Wayback Machine, Dec. 21, 1996.

Prodigy–1 (tutorial namual), Internet Archive Wayback Machine, Jan. 16, 1998.

"Focus Groups Come Alive on Prodigy," Business Wire, Nov. 17, 1994.

"EarthWeb Releases the Most Advanced Moderated Discussion Product for the Net," PR Newswire Association, Inc, Jun. 23, 1997.

EarthWeb–2 (tutorial) Internet Archive Wayback Machine, Jan. 15, 1998.

EarthWeb–3 (tutorial) Internet Archive Wayback machine, Jan. 15, 1998.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–16 is confirmed.

* * * * *